F. B. SNYDER.
RESILIENT VEHICLE WHEEL.
APPLICATION FILED APR. 7, 1922.

1,429,787.

Patented Sept. 19, 1922.
2 SHEETS—SHEET 1.

Inventor
F. B. Snyder.

By
Attorneys

F. B. SNYDER.
RESILIENT VEHICLE WHEEL.
APPLICATION FILED APR. 7, 1922.
1,429,787.
Patented Sept. 19, 1922.
2 SHEETS—SHEET 2.
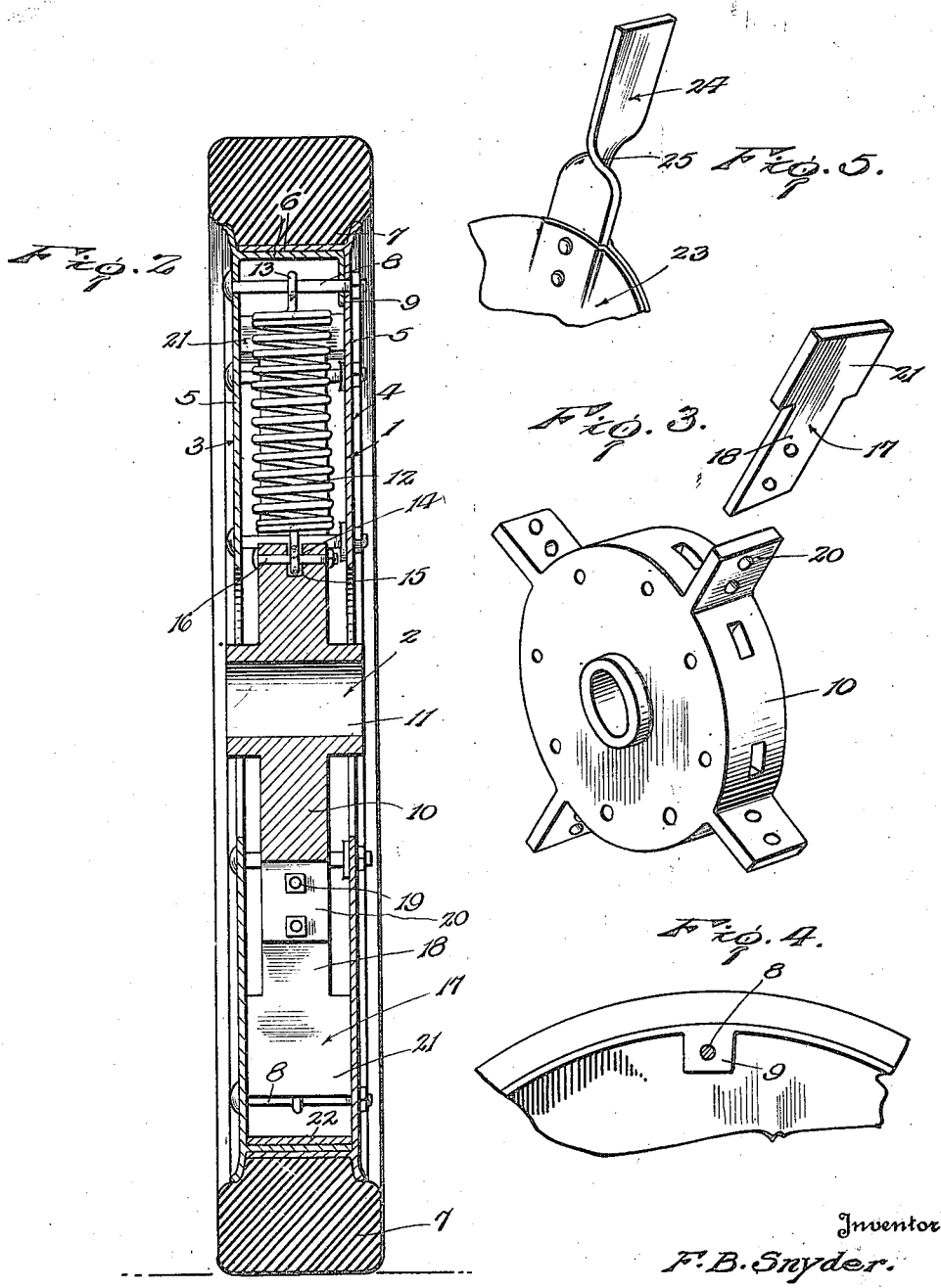
Inventor
F. B. Snyder.
By Lacy & Lacey, Attorneys Patented Sept. 19, 1922.

1,429,787

UNITED STATES PATENT OFFICE.

FRANK B. SNYDER, OF ALTOONA, PENNSYLVANIA.

RESILIENT VEHICLE WHEEL.

Application filed April 7, 1922. Serial No. 550,399.

*To all whom it may concern:*

Be it known that I, FRANK B. SNYDER, a citizen of the United States, residing at Altoona, in the county of Blair and State of Pennsylvania, have invented certain new and useful Improvements in Resilient Vehicle Wheels, of which the following is a specification.

This invention relates to improvements in resilient wheels and has as its general object to provide a wheel which will possess a degree of resiliency equal to that of a wheel equipped with pneumatic tires but will present none of the disadvantages of the latter type of wheel.

Another object of the invention is to provide a resilient wheel, which while it will yield to shocks and impacts and effectually cushion the travel of a vehicle over a road surface, will at the same time be so substantial as to effectually withstand any unusual forces which might be exerted against it and which in a less substantial wheel would cause damage.

Another object of the invention is to provide in a resilient wheel embodying a floating hub, means for effectually bracing the hub against lateral displacement from the plane of the wheel body.

Another object of the invention is to provide a resilient wheel of such construction that it may be readily and conveniently assembled, or taken down when repairs become necessary and in which broken parts may be readily renewed at a minimum cost.

In the accompanying drawings:

Figure 2 is a transverse sectional view taken substantially on the line 2—2 of Figure 1 looking in the direction indicated by the arrows;

Figure 3 is a perspective view illustrating the hub and one of the guiding and bracing members associated therewith;

Figure 4 is a fragmentary side elevation of one member of the body of the wheel; and Figure 5 is a fragmentary perspective view illustrating a modified form of the hub and guiding and bracing member.

Figure 1:
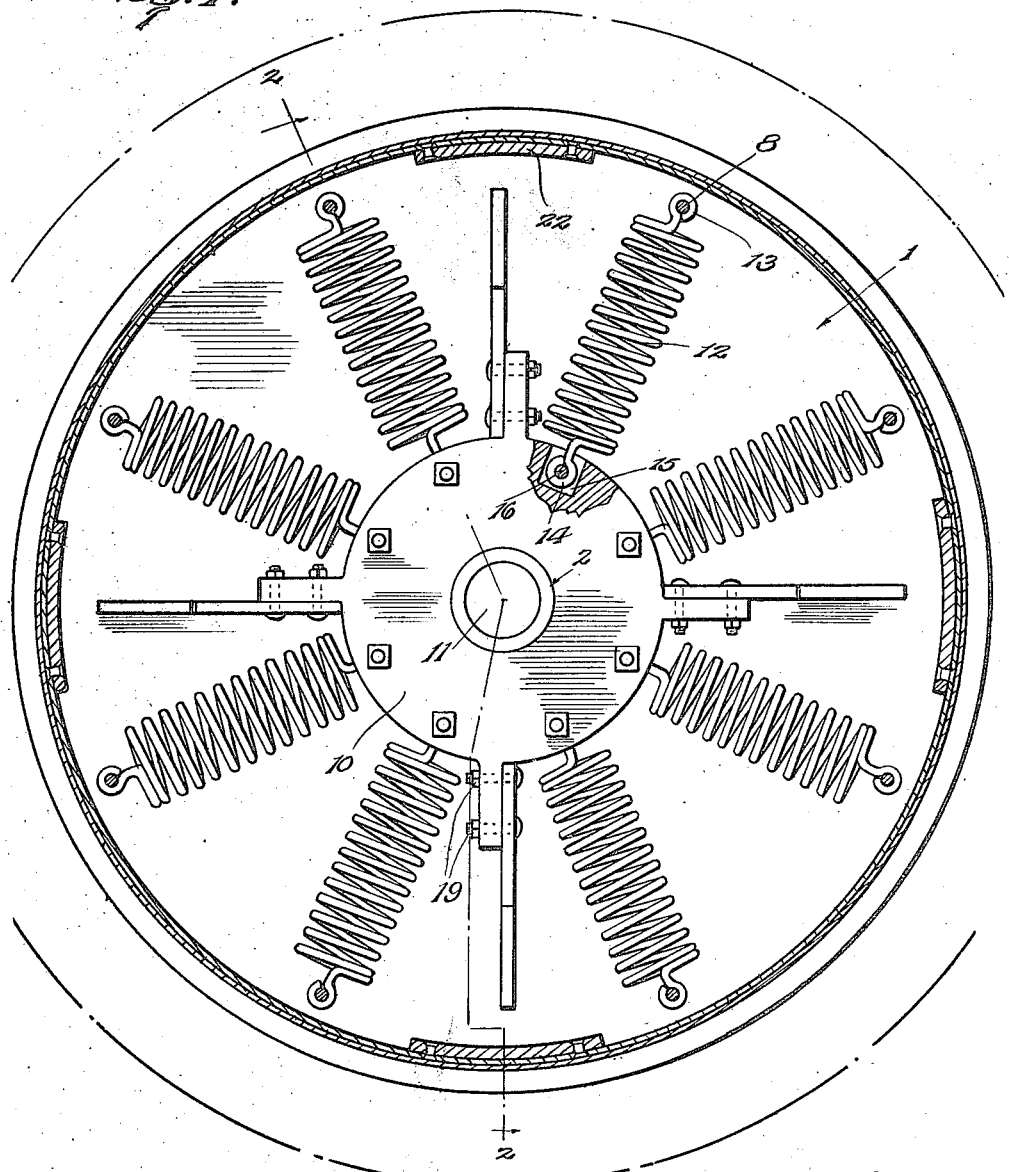
Figure 1 is a vertical front to rear sectional view through a vehicle wheel constructed in accordance with the present invention.

The principles of the invention may be embodied in the construction of automobile and similar vehicle wheels, or in wheels designed for employment upon toy wagons and other small size vehicles designed for children's use, and in the embodiment illustrated in the drawings, the wheel comprises a body indicated in general by the numeral 1 and a hub indicated in general by the numeral 2. The body 1 may have its component parts formed from compressed steel or other sheet metal or the said parts may be manufactured by some other method. In any event the body will preferably comprise sections which are indicated in general one by the numeral 3 and the other by the numeral 4. These sections 3 and 4 are substantially of counterpart form and each comprises an annular side plate 5 formed or provided upon its inner face with a laterally projecting annular flange 6 the flanges of the two sections being of such diameter as to adapt the flange of section 3 for example to fit snugly within the flange of the section 4 as shown in Figures 1 and 2 of the drawings. The marginal or peripheral portions of the side plates 5 comprising sections 3 and 4 project a suitable distance beyond their respective flanges 6 so as to provide a tire channel 7 surrounding the body of the wheel and adapting the said body for the application thereto of any of the ordinary types of tires. Of course where the invention is embodied in a wheel of a type designed for use on the smaller kinds of vehicles, this portion of the structure may be modified so as to adapt the body for the application thereto of a different form of tire, or the use of a tire may be dispensed with altogether. In order that the sections 3 and 4 of the wheel body may be securely held together, bolts 8 are secured transversely through the side plates 5 of the said sections preferably immediately inwardly of the flanges 6, and the said flange 6 of the section 3 is formed at suitably spaced intervals with radially inwardly projecting ears 9 through which also the bolts are passed, the provision of these ears and the engagement of the bolts therethrough serving to further relatively brace the sections and strengthen the body.

The hub 2 of the wheel comprises a flat sided circular body 10 provided with an axial opening 11 to accommodate the spindle upon which the wheel is to be mounted, and this body 10 is yieldably supported concentrically within the bounds of the body of the wheel by means of springs 12 which are preferably radially disposed as illustrated in Figure 1 and are provided at their outer ends with eyes 13 engaged with the bolts 8. The springs 12 are provided at their inner ends with similar eyes 14 which are disposed within recesses 15 formed at suitable intervals in and about the periphery of the body 10, bolts 16 being secured transversely through the said body and extending across the recesses and through the eyes 14. In this manner a yieldable and resilient connection is established between the body and hub of the wheel and the hub is therefore supported in a normally centered position with relation to the wheel body but is capable of floating within the bounds of the body. The springs 12 may of course be of any desired number and of any required strength in accordance with the maximum load to be sustained.

It will now be evident that the hub 2 is resiliently supported in such manner as to yield when the tread of the wheel body is subjected to shocks and impacts and that in this manner the travel of the vehicle over the road surface is cushioned.

In order to prevent lateral displacement of the hub and to guide it for floating movement in a plane between the planes occupied by the side plates 5 of the body sections 3 and 4, bracing and guiding members 17 are provided upon the hub 2. In that form of the invention shown in Figures 1 to 3 inclusive, each of the bracing and guiding members 17 comprises an arm 18, preferably flat sided and bolted or otherwise secured as at 19 at its inner end to the associated one of a number of radial lugs 20 arranged about the periphery of the hub body 10. The inner portions of the arms 18 may be of the same width as the hub body 10 and therefore of less width than the distance between the side plates 5 of the body sections 3 and 4, but at their outer portions at least these arms are broadened to provide heads 21 which are of such width as to ride at their lateral edges substantially in contact with the inner or opposed faces of the said side plates 5. The arms 17 are radially disposed with relation to the hub but are of a length to terminate short of the circle described by the flanges 6 of the body sections 3 and 4 so that their presence does not interfere with the proper functioning of the cushioning springs 12 in the floating movement of the hub 2. However in order to prevent any possible injury to the said flanges of the body sections, wear plates 22 are preferably provided upon the inner surface of the flange 6 of the section 3 at points opposite the outer ends of the arms 18. It will now be evident that the heads 21 of the arms 18 being confined between the side plates 5 of the body sections 3 and 4, constitute means for coaction with these side plates to restrain the hub against displacement from the plane in which it is intended it shall float, these members serving also to brace the hub and the body of the wheel so that the wheel will not be distorted when subjected to lateral thrusts or strain.

Figure 5 of the drawings illustrates a slight modification of the invention and in this form the hub is indicated in general by the numeral 23 and preferably comprises a pair of sections disposed face to face and receiving between their peripheral portions the inner ends of guiding and bracing arms 24 corresponding to the members 17, so far as function is concerned, but differing somewhat in structure. Preferably each of the members 24 is formed from a plate which has its intermediate portion twisted as indicated by the numeral 25 so as to dispose its inner and outer portions in planes substantially at right angles to each other.

While a wheel constructed in accordance with the present invention will possess the same or a greater degree of resiliency as compared with a wheel equipped with a pneumatic tire, it performs another function which presents great advantages where it is to constitute one of the driving wheels of a vehicle. In this case, in starting the vehicle, and when power is initially applied to the drive axle, the first result will be a partial rotation of the hub 2, but this movement is resisted to an extent by the springs 12 which are at such time placed under great tension, and as the springs tend to assume their initial form, they will assist the motive mechanism of the vehicle in overcoming inertia. Furthermore the springs serve to partly absorb and relieve the strains and stresses imposed upon the motive means for propelling the vehicle, at the time of starting the vehicle.

Having thus described the invention, what is claimed as new is:

1. A resilient wheel comprising a body including sections each comprising a side plate and an inwardly projecting annular flange, the flange of one section fitting within the flange of the other section and the first mentioned flange having inwardly projecting ears, bolts secured through the side plates of the sections inwardly of the flanges and extending also through said ears, a hub, and means yieldably resiliently supporting the hub within the circumference of the body for floating movement.

2. A resilient wheel comprising a body including sections each comprising a side plate and an inwardly projecting annular flange, the flange of one section fitting within the flange of the other section and the first mentioned flange having inwardly projecting ears, bolts secured through the side plates of the sections inwardly of the flanges and extending also through said ears, a hub, the hub having recesses in its periphery, bolts extending across the recesses, and springs for yieldably supporting the hub within the circumference of the body for floating movement, the springs being connected at their inner ends to the last-mentioned bolts and at their outer ends to the first-mentioned bolts.

In testimony whereof I affix my signature.

FRANK B. SNYDER. [L. S.]